US012595206B2

(12) United States Patent
Durand et al.

(10) Patent No.: US 12,595,206 B2
(45) Date of Patent: Apr. 7, 2026

(54) METHOD OF CALCINING A CLAY MATERIAL

(71) Applicant: Amrize Technology Switzerland LLC, Zug (CH)

(72) Inventors: Thomas Durand, Holderbank (CH); Pascal Dion, Holderbank (CH)

(73) Assignee: Amrize Technology Switzerland LLC, Zug (CH)

( * ) Notice: Subject to any disclaimer, the term of this patent is extended or adjusted under 35 U.S.C. 154(b) by 270 days.

(21) Appl. No.: 18/257,468

(22) PCT Filed: Dec. 14, 2021

(86) PCT No.: PCT/IB2021/061683
§ 371 (c)(1),
(2) Date: Jun. 14, 2023

(87) PCT Pub. No.: WO2022/130192
PCT Pub. Date: Jun. 23, 2022

(65) Prior Publication Data
US 2024/0101477 A1     Mar. 28, 2024

(30) Foreign Application Priority Data
Dec. 15, 2020     (EP) ..................................... 20290081

(51) Int. Cl.
*C04B 7/43*          (2006.01)
*C04B 7/13*          (2006.01)
*C04B 7/52*          (2006.01)

(52) U.S. Cl.
CPC ................ *C04B 7/434* (2013.01); *C04B 7/13* (2013.01); *C04B 7/52* (2013.01)

(58) Field of Classification Search
CPC .. C04B 7/434; C04B 7/13; C04B 7/52; C04B 28/04; C04B 7/12
See application file for complete search history.

(56) References Cited

U.S. PATENT DOCUMENTS

2014/0000491 A1 *  1/2014  Gasafi ..................... C04B 28/04
                                                      106/457
2022/0363601 A1 *  11/2022  Martinage ............... C04B 14/06

FOREIGN PATENT DOCUMENTS

| DE | 102010061456 A1 * | 6/2012 | |
| DE | 102011014498 A1 * | 9/2012 | ............... C04B 7/13 |
| EP | 2 253 600 A1 | 11/2010 | |
| EP | 2735555 A1 * | 5/2014 | ............. C01B 33/20 |
| GB | 2 119 359 A | 11/1983 | |
| RU | 2140875 C1 * | 11/1999 | |
| WO | WO-2012126696 A1 * | 9/2012 | ............... C04B 7/13 |
| WO | WO-2020025783 A1 * | 2/2020 | ......... C04B 40/0042 |

OTHER PUBLICATIONS

Combined Calcination and CO2 Capture in Cement Clinker Production by use of Electrical Energy Taokheim Mathisen Oi Jayarathna Eldrup Gautestad TCCS-10 Trondheim Norway Trondheim CCS Conference CO2 Capture Tranport nd Storage Jun. 17-19, 2019 (Year: 2019).*
International Search Report as issued in International Patent Application No. PCT/IB2021/061683, dated Feb. 25, 2022.

* cited by examiner

*Primary Examiner* — Pamela H Weiss
(74) *Attorney, Agent, or Firm* — Osha Bergman Watanabe & Burton LLP

(57)          ABSTRACT

A method of calcining a clay material for use as a supplementary cementitious material, includes providing a raw clay material, optionally drying the raw clay material, granulating the raw clay material in order to obtain raw clay granules, calcining the raw clay granules to obtain calcined clay granules, and grinding the calcined clay granules to obtain a pulverulent supplementary cementitious material.

18 Claims, No Drawings

METHOD OF CALCINING A CLAY MATERIAL

CROSS-REFERENCE TO RELATED APPLICATIONS

This application is the U.S. National Stage of International Application Serial No. PCT/IB2021/061683, filed Dec. 14, 2021, which in turn claims priority to European Application No. 20 290 081.7, filed Dec. 15, 2020. The contents of all of these applications are incorporated herein by reference in their entirety.

The invention refers to a method of calcining a clay material for use as a supplementary cementitious material. The invention also refers to a calcined clay product obtained by such a method.

Various types of mineral components may be added to Portland cement in order to obtain composite cements. In particular, it has become common practice to use pozzolanic and/or latent hydraulic material as supplementary cementitious materials in Portland cement mixtures.

By substituting supplementary cementitious materials for Portland cement the specific emission of $CO_2$ in the production of cement will be reduced. During the production of Portland cement clinker a considerable amount of $CO_2$ per ton of Portland cement clinker is emitted by the decarbonation of the raw materials and from the oxidation of the fuels that occur during calcination of the raw materials in the rotary tubular kiln.

Supplementary cementitious materials comprise a broad class of siliceous or siliceous and aluminous materials which, in finely divided form and in the presence of water, chemically react with calcium hydroxide at ordinary temperature to form compounds possessing cementitious properties. Examples of supplementary cementitious materials include granulated blast-furnace slag, fly ash, natural pozzolans, burnt oil shale, or calcined clay.

Cement is a product that in most cases is used in locations relatively close to where it is manufactured. Therefore, in case of composite cements, its production requires the availability of a source of a supplementary cementitious material, this source being either natural or synthetic. However, the local availability of such source is not guaranteed in all regions where cement is produced, mainly because of the decreasing availability of some synthetic sources of supplementary cementitious materials. Synthetic supplementary cementitious materials are in most cases a by-product of various industrial processes, such as fly ash from coal-fired power plants or blast-furnace slag from steel mills. The decreasing supply of fly ash from the power industry is encouraging the search for new sources of supplementary cementitious materials for the cement and concrete production.

Therefore, increasing efforts are undertaken to use widely available sources for producing supplementary cementitious materials, such as clay. Kaolinitic clay was shown to be the best clay raw material for the production of supplementary cementitious materials, but in its pure form it is only found in a limited number of deposits. For this reason, there has been interest in the possibility of producing supplementary cementitious materials from other locally available natural clays containing, in addition to kaolinite, other minerals which have the potential to develop pozzolanic activity upon appropriate activation. In particular, it has been found that the activation process of various types of raw clay can be carried out mechanically (e.g. by grinding) and/or thermally by heating to a temperature high enough to alter the structure of the clay minerals by dehydroxylation, but low enough to avoid recrystallization and the formation of chemically inert phases. Controlling the activation process is essential in order to obtain defined pozzolanic properties of the resulting supplementary cementitious material, because the pozzolanic properties in turn determine the substitution rate of Portland clinker in a composite cement and the compressive strength properties of the concrete made from the composite cement.

In order to safeguard a uniform heat treatment with reproducible dehydroxylation results and thus reproducible pozzolanic properties, the raw clay material is usually dried to a defined residual water content and ground to a defined fineness before being introduced into the calcination device. The calcination of a pulverulent material thus obtained, however, requires specific installations in order to cope with the dust formation during such processes, such as during transport of the raw clay material, during calcination and during the subsequent cooling. It is therefore not feasible to integrate such processes into a cement manufacturing plant. For example, the dust formation would result in the clogging of filters in the cement manufacturing plant. Further, small particles of raw clay would be entrained with the gas flow occurring in a cement manufacturing plant, precipitate further downstream and interfere with the controlled manufacturing conditions established within the cement manufacturing process. For this reason, heat recovery is either not feasible or with limited efficiency.

Therefore, it is an object of the invention to adapt a production method of a calcined clay material so as to integrate as many steps of the process as possible into a cement manufacturing plant. Further, the method shall be as flexible as possible with regard to the type and condition of the raw clay material, e.g. the process shall be equally suitable for raw clay material that is provided as a relatively dry powder as for raw clay material that is provided in a moist or pasty form.

In order to solve this object, the invention provides a method of calcining a clay material for use as a supplementary cementitious material, comprising the steps of:
  providing a raw clay material,
  optionally drying the raw clay material,
  granulating the raw clay material in order to obtain raw clay granules,
  calcining the raw clay granules to obtain calcined clay granules,
  grinding the calcined clay granules to obtain a pulverulent supplementary cementitious material.

The invention is based on the idea to granulate the raw clay material before it is being calcined, in order to avoid dust formation. Once having been brought into the form of granules, the raw clay material has the following advantages:
  increasing the efficiency of the thermal exchange with waste gas in a lepol type heat exchanger,
  enabling a dust-free calcination process,
  increasing the efficiency of thermal exchange in a reciprocating cooler,
  facilitate the storage, the conveying and the handling of the calcined clay in the cement plant, so that its processing can be integrated into a cement manufacturing plant without negatively affecting the cement manufacturing process and/or the cement manufacturing installations of said plant. For example, granulated clay is easier to store in silos, since it reduces the occurrence of clogging of material in the silo.

It was further surprisingly found that the calcium carbonate initially present in the clay material is not decarbonated during the process. This has the advantage of eliminating a source of $CO_2$ emissions, and making limestone available as a mineral component in the final cement.

Further, it has surprisingly been found that the calcination process of the raw clay material is not negatively affected by the material being in the form of granules, contrary to what had been suggested previously. Thus, the dehydroxylation process is not impaired, even though the exposed surface area of the raw clay material is considerably less with the material being in the form of granules when compared to a fine powder.

Further, it has been found that the raw clay granules have a sufficient mechanical stability needed for subjecting the granules to various processing steps, such as drying, dumping, conveying and calcining the granules, e.g., calcining in a rotary kiln.

When referring to the calcination of raw clay material in order to obtain calcined clay, this is understood to mean the activation of the raw clay material by at least partly dehydroxylating clay minerals at an elevated temperature so as to obtain pozzolanic properties. The process of dehydroxylation leads to damage in the crystal structure of clay minerals and results, inter alia, to an increased exposure of Al ions on the surface of the mineral grains and increased solubility. The dehydroxylation temperature depends on the structure of the minerals and can range from 350° C. to 900° C., and for its full effect in most cases the raw clay material must be heated to temperatures between 600 and 800° C.

Although the method of the invention may be used with various types of raw clay material, particularly good pozzolanic properties can be achieved, if a minimum content of kaolinite is provided. Therefore, according to a preferred embodiment, the raw clay material contains at least 30%, preferably at least 40%, kaolinite, based on the weight of the dry raw clay material. When referring to a dry raw material, this is understood to mean a dry raw material that has less than wt.-% of free water, wherein free water is defined by water that is able to evaporate at temperatures below 105° C.

According to another preferred embodiment, the raw clay material contains calcium carbonate, the calcium carbonate content preferably being in the range of 0, 1 to 50 wt.-%, or 2-15 wt.-%, based on the weight of the dry raw clay material. In particular, the raw clay material contains both, at least 30%, preferably at least 40%, kaolinite, based on the weight of the dry raw clay material, and calcium carbonate.

Alternatively, the calcium carbonate may be partially or totally substituted by calcium magnesium carbonate.

The granulation step of the invention comprises the agglomeration of raw clay material to form distinct, separate and stable granules. In order to avoid dust formation when calcining the granules, the particle size of said granules shall be substantially larger than a typical particle size of finely ground raw clay. Hence, according to the invention, the granulation step is carried out to obtain raw clay granules having a volume based particle size of 3 mm to 80 mm. Preferably, the granulation step is carried out to obtain raw clay granules having a volume based particle size of 25-35 mm. The volume-based particle size equals the diameter of the sphere that has the same volume as a given particle.

Preferably, the granulation step is performed as a wet or semi-wet granulation, wherein granules are formed by subjecting a wet or moist raw material to the influence of an impeller or a screw, resulting in the aggregation of the material to produce wet or semi-wet granules that will have to be dried. Different types of granulators may be used for the wet or semi-wet granulation, such as a rotating drum granulator, a disc granulator or a granulating table. Preferably, a semi-vertical rotating pan granulator is used. Such a granulator comprises a shallow cylindrical pan that is attached to a base support and rotated about an inclined axis. The rotation is accomplished by a drive means which is operably connected to the pan through an axle. The angle of inclination and the speed of rotation of the pan are usually variable and are adjusted as is conventional to produce the desired size granule. The raw clay material is supplied to the surface of the pan through a discharge means and liquid is sprayed onto the raw clay material with spray means.

Alternatively, the granulation may also be performed by dry granulation, which comprises compacting a dry powder of raw clay material into the forms of granules, such as by means of a swaying granulator or a roll compactor.

Depending on whether the raw clay material is provided in a dry, semi-wet or wet state, the following preferred granulation methods may be used.

According to a first process, a dry pulverulent raw clay material may be obtained by drying a raw material and grinding it in a mill, such as a ball mill with a drying compartment or a vertical mill. The raw materials are first dried and ground in order to transport them with ease. The preferred fineness target is a particle size of less than 500 μm, such as by passing the particles through a 500 μm sieve, and residual water in the raw clay material should not exceed 10%, preferably 5%, of the weight of the raw material before granulation. The drying process can be done directly by contacting the raw clay material with hot air, or via a drying screw which is heated from heat recovered from the cement calcination process, such as hot air.

Part of the energy required for drying the raw clay material may come from hot air that can be recovered in the clinker cooler of the cement manufacturing plant, or hot air produced during the cooling of the calcined clay in a cooler.

Grinding the raw materials is also a convenient way to mix several raw clay material sources in a homogeneous way.

After grinding and drying, the material forms a raw clay meal that can be stored into a silo. The raw clay meal may later be extracted from the silo, dosed and injected into a semi vertical rotating pan granulator, with a water injection of 10 to 20 wt.-% based on the raw clay material, in order to produce granules.

According to a second process, if the raw clay material is provided in a semi-wet state, the granulation may preferably be performed as follows. The water content of the raw clay material prior to granulation may be between 10% and 40% of the weight of raw clay material. This can for example be achieved by mixing a dry clay with a clay that contains higher amounts of water, or by removing excess water from a very wet clay, using known processes such as a filter press, or a heated screw. Such semi-wet raw clay material is introduced into a rotating granulator, such as a semi vertical rotating pan granulator, wherein larger clay agglomerates leave the granulator alone, or with the help of a rotating rake and small clay particles will be agglomerated with clay meal in order to create granules.

Compared to the first process described above, this process has the advantage of reducing the amount of energy required for drying the clay material.

According to a third process, the granulation is adapted for clay material with a high water content, i.e. above 40% of the weight of the raw clay material. Depending on characteristics of the raw clay material, and mainly its plasticity, it would be possible to feed the raw clay directly into the granulator, without further addition of water. Water can be added if required, to help the agglomeration process, especially in case of the presence of fine raw clay particles (<500 μm).

If the granulation process requires the addition of a liquid, various sources of water may be used. Pure clean water can be used, but also liquid mud (slurry) containing kaolinite, such as washing water from the production of aggregates in quarries. It is also possible to use non-hazardous liquid waste containing >95% water.

The water content in the clay material shall preferably not exceed 50%.

As mentioned above, a step of drying the raw clay granules is optionally performed prior to the calcination step. According to a preferred embodiment, the drying step is carried out by means of an existing installation of a cement manufacturing plant, such as in a heat exchanger or in a cement raw material preheater of the cement manufacturing plant. Irrespective of whether an existing installation of the cement manufacturing plant is used for the drying step or a separate installation is used, the drying step may be thermally coupled to the cement manufacturing process. In particular, the drying step may preferably comprise introducing the raw clay granules into a heat exchanger and heating the raw clay granules in heat exchange with an exhaust gas directly or indirectly coming from a calcination kiln of a cement manufacturing plant. In this way, the waste heat of the cement manufacturing process can be used to dry the raw clay granules.

In a particularly preferred embodiment, the drying step comprises forming a material bed of the raw clay granules on slotted grate plates of a moving grate preheater and directing a flow of hot gas, preferably exhaust gas coming from a calcination kiln, through the slotted grate plates and the material bed. Moving grate preheaters are used in many existing cement manufacturing plants having a Lepol-type kiln layout to dry and preheat cement raw meal. Such cement plants are producing cement according to the semi-wet or the semi-dry cement manufacturing process. By using such an existing moving grate preheater, the raw clay granules drying process can efficiently be integrated into a cement production line.

Preferably, the granules are placed on the slotted grate plates of the moving grate preheater to form a bed having a thickness of 5 to 40 cm. The granules can then be easily placed on such grates, as their size enables the granules to remain on the grate and not fall through.

In the moving grate preheater, a heat exchange is created between hot exhaust gas coming from the cement kiln and the raw clay granules, in order to remove water and solidify the granules. An additional effect is that the bed of raw clay granules may function as a filter to retain dust that is entrained with the exhaust gas coming from the cement kiln.

Further, the bed of raw clay granules may trap pollutants, such as $SO_2$ and HCl. $SO_2$ is trapped into the raw clay material.

The typical residence time of the raw clay granules in the heat exchanger may preferably range from 30 min to 2 h.

Turning now to the calcination step of the method of the invention, the calcination step may preferably be carried out in a rotary kiln, said rotary kiln preferably being heated by fuel (such as petcoke, fuel oil, biomass waste) and hot gas recovered in the calcined clay cooler. A rotary kiln is operated preferably with an oxygen content of <8 vol.-%.

Preferably, the calcination step is carried out at a temperature of 600-800° C., preferably around 700° C. This temperature range enables an ideal calcination of the granules by dehydroxylation of the kaolinite of the raw material to create a calcined clay with good pozzolanic properties. This process minimizes the decarbonation of the calcium carbonate that could remain in the granules, and therefore reduces the emissions of $CO_2$ during the calcination process.

Preferably, the residence time of the raw clay granules in the calcination kiln is selected to be 1.5-3 hours.

Various types of fuels may be used for the calcination. Due to the heat recovery from the heat exchanger, the granulation and the filtration effect of the raw clay granules, a wide range of fuel may be used in the rotary kiln, including oil, high sulfur petcoke, non-hazardous waste and 100% biomass fuel. In the latter case, calcined clay can be produced with close to 0 kg $CO_2$/t of emissions.

The calcined granules produced in the process of the invention are hard, and without the formation of liquid phases, compared to the production processes of expanded clays. This allows the usage of any cooler type used in the cement industry for cooling the calcined granules. Further, the fact of having granules increases the heat recovery of coolers. Secondary air temperature (hot air going to the kiln) can reach temperatures of 500 to 700° C., allowing to use a wide range of fuel mixes (as mentioned above).

After calcining the raw clay granules to obtain calcined clay granules, the latter are ground to obtain a supplementary cementitious material. This grinding is preferentially done together with Portland clinker and other supplementary materials in order to provide a composite Portland cement. Any constituent described in the standard NF EN 197-1 (April 2012) may be used together with Portland clinker to produce a composite cement.

In an alternative process, the calcined clay granules may be ground alone. The ground calcined clay may later be added to other cement constituents in a blending station to produce a composite Portland cement, or may be added as a separate component when at a concrete ready-mix plant.

The calcined clay obtained from the process described here can also be used to make a low carbon binder, such as an alkali activated calcined clay that does not contain any Portland clinker. These binders have low carbon footprint when compared to most Portland cements. Alkali-activated binders are made from calcium-rich raw materials that are activated with high alkaline solutions.

EXAMPLE

In the following example, the following two components were blended:

60 dry.-% of a clay extracted from the quarry of Bellegarde (France). This clay initially contained 15 to 18 wt.-% of water, was dried and ground in a vertical mill at a fineness of 7,500 to 12,000 cm2/g. This product was then then mixed with 40 dry.-% of a dry product, in powder form, containing 64% of kaolinite, supplied by Sibelco.

Granules were produced and subjected to a stability test, wherein the granules were dropped from a height of 5 meters, and remained intact. This easy test confirms that the granules are suitable for handling and storage in a cement plant.

Further, the raw material powders were analyzed by X-ray diffraction to quantify the main components and assess the impact of the calcination temperature (1 h) on the content of the individual components. In particular, it was analyzed, whether the material transformations obtained as a consequence of the calcination process are influenced by whether the clay material is calcined in granulated form or in its original powder form. Particular attention was paid to the decarbonation of the calcium carbonate component of the clay. As mentioned before, decarbonation of the calcium carbonate component of the clay is to be avoided as much as possible due to the undesired formation of $CO_2$.

The results are summarized in the table below.

TABLE 1

| Calcination of clay without prior granulation: | | | | | | |
|---|---|---|---|---|---|---|
| | Clay powder | Temperature of calcination | | | | |
| | before calcination | 500° C. | 600° C. | 700° C. | 750° C. | 800° C. |
| Kaolinite (wt.-%) | 23 | 18 | <2 | <1 | <1 | <1 |
| Lime (wt.-%) | <1 | <1 | <1 | 2 | 3 | 4 |
| Calcium carbonate (wt.-%) | 14 | 12 | 11 | 7 | 2 | <1 |
| Calculated decarbonation wt.-% | 0 | 14 | 22 | 50 | 86 | 98 |

TABLE 2

| Calcination of clay after having been transformed into granules | | |
|---|---|---|
| | | 750° C.* |
| Kaolinite (wt.-%) | 23 | 0.595 |
| Lime (wt.-%) | <1 | 0.06 |
| Calcium carbonate (wt.-%) | 14 | 9.48 |
| Calculated decarbonation wt.-% | | 32% |

*estimated based on cooler heat balance

Industrial test shows that the calcination process with granulation is more efficient than powder in lab: For full kaolinite conversion into metakaolin (<1% remaining kaolinite), decarbonation is reduced to 32%, vs 50% in lab test.

For the same temperature (750° C.), decarbonation is reduced to 32% vs 86% in lab test. This higher temperature enables to reach 850° C. for 2 s in order to process waste.

The effect of granulation to decrease the decarbonation level despite of higher calcination temperature is essential to reduce carbon footprint ($CO_2$ from decarbonation+$CO_2$ from fuel).

The invention claimed is:

1. A method of calcining a clay material for use as a supplementary cementitious material, comprising:
   providing a raw clay material,
   optionally drying the raw clay material,
   granulating the raw clay material in order to obtain raw clay granules,
   calcining the raw clay granules to obtain calcined clay granules, and
   grinding the calcined clay granules to obtain a pulverulent supplementary cementitious material,
   wherein the granulating is carried out to obtain raw clay granules having a volume based particle size of 25 mm to 80 mm.

2. The method according to claim 1, wherein the raw clay material contains at least 30%, of kaolinite, based on the weight of the dry raw clay material.

3. The method according to claim 1, wherein the raw clay material is provided in the form of a powder and wherein the granulating comprises introducing the raw clay powder into a rotating granulator, sprinkling the raw clay powder with water and forming the raw clay granules.

4. The method according to claim 1, wherein the raw clay material is provided in the form of a paste having a water content of 10-40 wt.-% of the raw clay material, and wherein the granulating comprises introducing the paste into a rotating granulator and forming the raw clay granules.

5. The method according to claim 1, wherein the raw clay material is provided clay material with a water content of above 40 wt.-% of the raw clay material, and wherein the granulating comprises introducing the material into a rotating granulator and forming the raw clay granules.

6. The method according to claim 3, wherein a vertical or semi-vertical rotating pan granulator is used for granulating the raw clay material.

7. The method according to claim 1, wherein the drying is carried out in a cement raw material preheater of a cement manufacturing plant and/or the calcinating is carried out in a calcination kiln of a cement manufacturing plant.

8. The method according to claim 1, wherein the drying comprises introducing the raw clay granules into a heat exchanger and heating the raw clay granules in heat exchange with an exhaust gas coming from a calcination kiln of a cement manufacturing plant.

9. The method according to claim 1, wherein the drying comprises forming a material bed of the raw clay granules on slotted grate plates of a moving grate preheater and directing a flow of hot gas through the slotted grate plates and the material bed.

10. The method according to claim 1, wherein the calcining is carried out in a rotary kiln.

11. The method according to claim 1, wherein the step calcining is carried out at a temperature of 600-800° C.

12. The method according to claim 1, wherein a residence time of the raw clay granules in the calcination kiln is selected to be 1.5-3 hours.

13. The method according to claim 2, wherein the raw clay material contains at least 40% of kaolinite, based on the weight of the dry raw clay material.

14. The method according to claim 9, wherein the flow of hot gas is exhaust gas coming from a calcination kiln.

15. The method according to claim 10, wherein the rotary kiln is heated by burning fuel.

16. The method according to claim 15, wherein the burning fuel is petcoke, fuel oil, biomass waste, or hot gas recovered in the calcined clay cooler.

17. The method according to claim 10, wherein the rotary kiln is operated with an oxygen content of <8 vol.-%.

18. The method according to claim 1, wherein the granulating the raw clay material at least reduces dust formation during calcining.

* * * * *